(12) United States Patent
Kociecki

(10) Patent No.: US 6,418,015 B1
(45) Date of Patent: Jul. 9, 2002

(54) COMPACT MULTIPLE OUTPUT POWER SUPPLY

(75) Inventor: John Kociecki, Powell, OH (US)

(73) Assignee: Tracewell Power, Inc., Westerville, OH (US)

( * ) Notice: Subject to any disclaimer, the term of this patent is extended or adjusted under 35 U.S.C. 154(b) by 61 days.

(21) Appl. No.: 09/696,984

(22) Filed: Oct. 26, 2000

Related U.S. Application Data

(62) Division of application No. 09/420,664, filed on Oct. 19, 1999, now Pat. No. 6,198,642.

(51) Int. Cl.[7] .................................................. H05K 7/20
(52) U.S. Cl. ........................ 361/695; 307/150; 363/141; 361/719
(58) Field of Search ............................... 361/694–697, 361/702–704, 707–710, 715–719, 788, 796; 363/37, 141, 144; 307/42, 43, 64, 66, 150, 155; 257/712; 323/907; 165/80.3, 185, 104.33; 211/41.1

(56) References Cited

U.S. PATENT DOCUMENTS

| | | | | |
|---|---|---|---|---|
| 5,168,171 A | * | 12/1992 | Tracewell | 307/64 |
| 5,612,854 A | * | 3/1997 | Wiscombe et al. | 361/727 |
| 5,940,288 A | * | 8/1999 | Kociecki | 363/144 |
| 5,945,746 A | * | 8/1999 | Tracewell et al. | 307/43 |
| 6,046,921 A | * | 4/2000 | Tracewell et al. | 363/141 |
| 6,069,789 A | * | 5/2000 | Jung | 361/684 |
| 6,198,642 B1 | * | 3/2001 | Kociecki | 363/37 |

* cited by examiner

*Primary Examiner*—Gerald Tolin
(74) *Attorney, Agent, or Firm*—Mueller and Smith, LPA

(57) ABSTRACT

A compact multiple output power supply which has a circuit architecture with distinct primary and secondary circuit domains. Within the secondary circuit domain, a distribution bus of relatively low constant voltage supplies power inputs to d.c.-to-d.c. converters providing regulated outputs and operating independently of each other. Because of the secondary circuit domain topology, surface mount components are made available in conjunction with relatively simple converter circuitry. Heat management within the compact housing of the power supply is achieved through the utilization of linear driven air flows in combination with employment of heat sinks extending to the heat sink configured cover of the housing. Additionally, the highest heat generation components are positioned rearwardmost within the driven air path.

14 Claims, 17 Drawing Sheets

Figure 1:
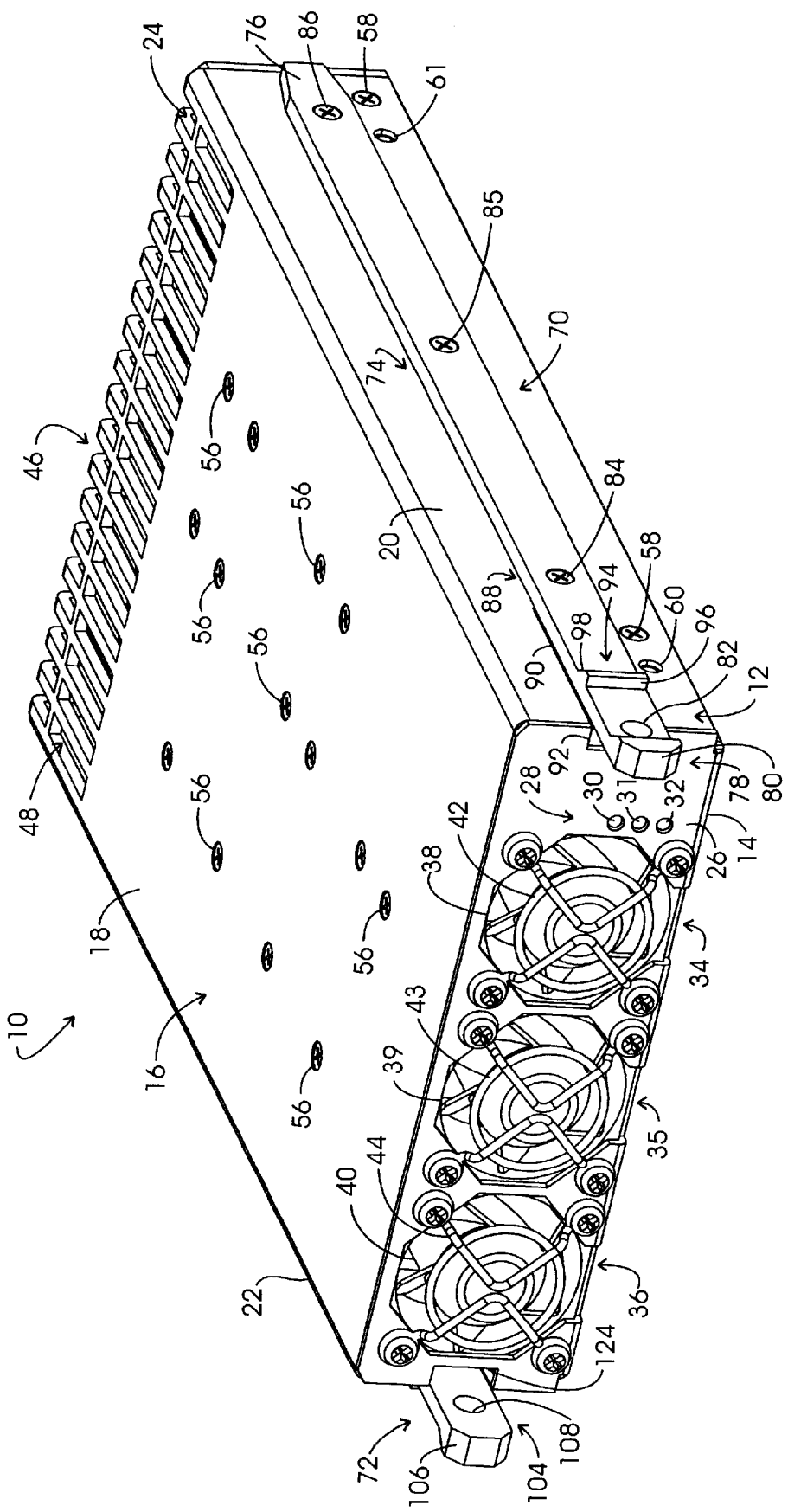

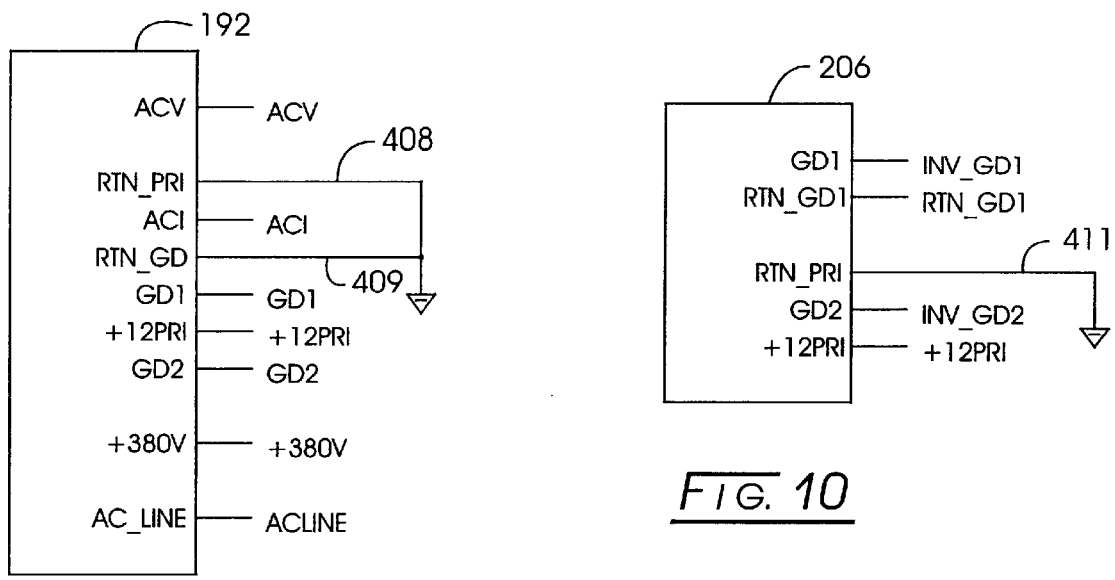
FIG. 9
FIG. 10
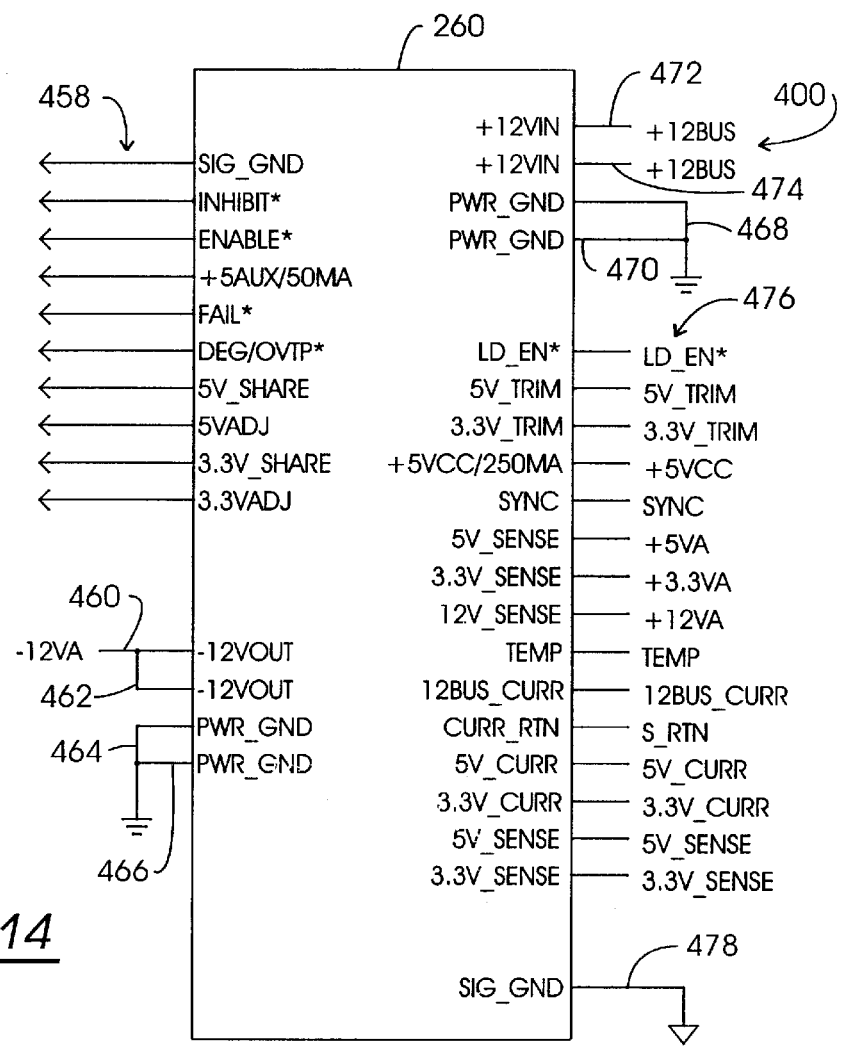
FIG. 14

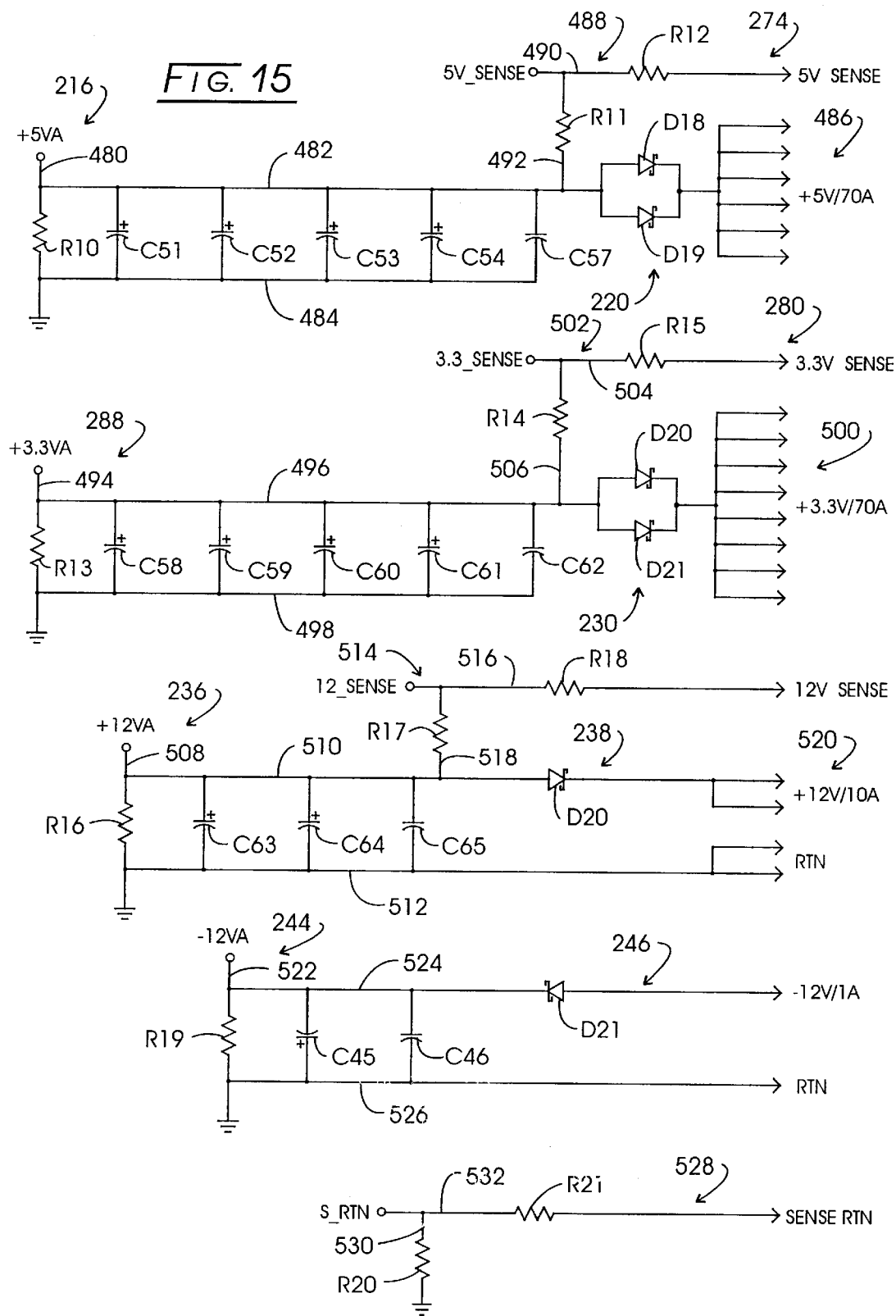

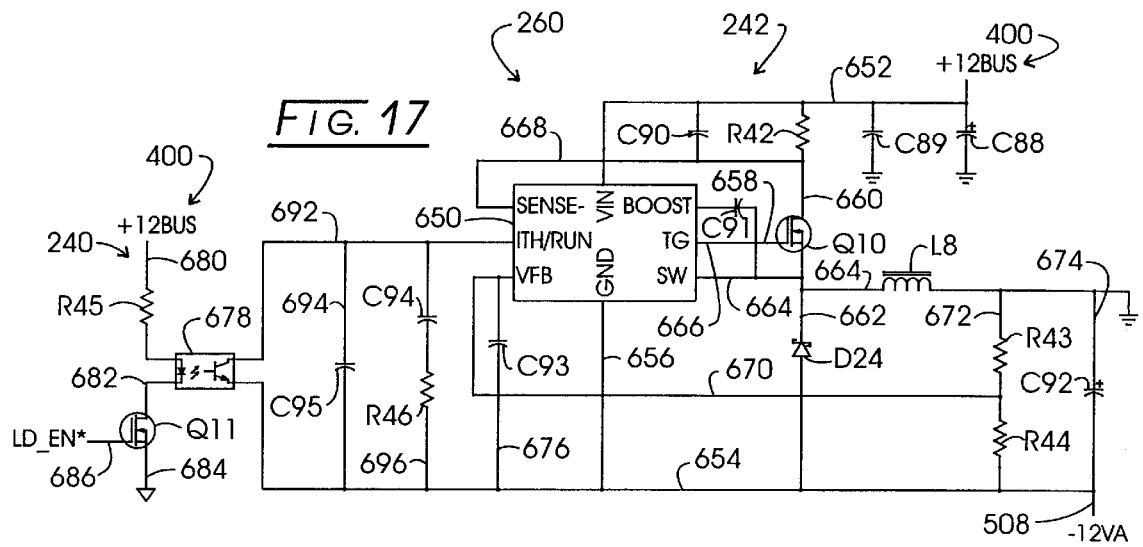

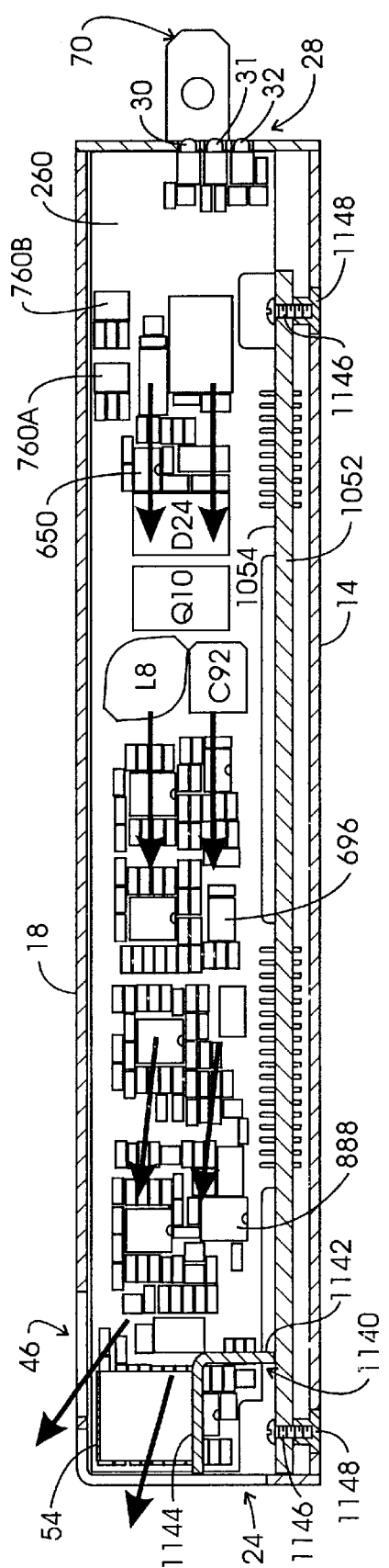
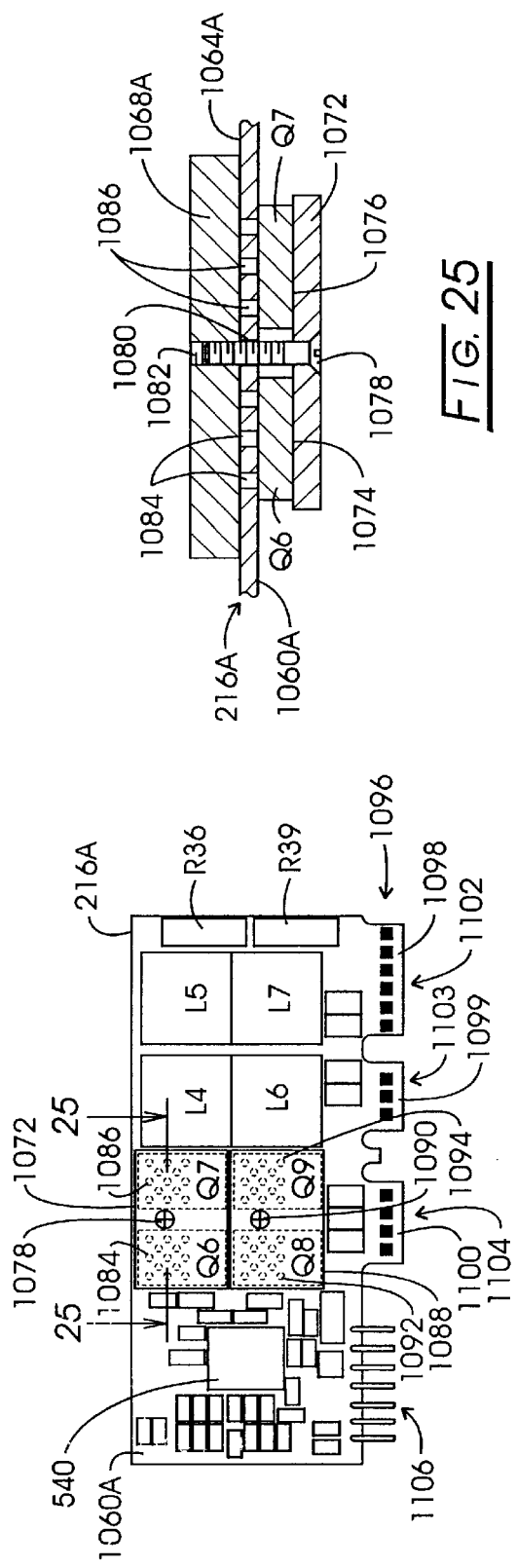
FIG. 25
FIG. 26
FIG. 24

COMPACT MULTIPLE OUTPUT POWER SUPPLY

CROSS-REFERENCE TO RELATED APPLICATIONS

This application is a divisional application of U.S. Ser. No. 09/420,664 filed Oct. 19, 2000; now U.S. Pat. No. 6,198,642 B1, issued Mar. 6, 2001, the disclosure of which is expressly incorporated herein by reference.

Providing such forward access has become an important aspect for high availability systems. Where a component such as a card or power supply fails or deteriorates to evoke a warning status, it is important that service personnel be capable of replacing it promptly. Being able to carry out that prompt servicing calls for front access to the components mounted in the mainframe. To further facilitate such rapid and relativity straight-forward component exchange, standards organizations are commencing to specify a feature wherein components are plugged into the system from the forward location while it is actively running. This feature is referred to as "hot swapping". One approach to providing power supplies which are accessible from the front of the mainframe is described in U.S. Pat. No. 5,940,288, issued Aug. 17, 1999 by Kociecki, entitled "Card Cage Mounted Power Supply With Heat Dissipating Architecture". The power supply described therein is thin, having a standard slot height and is inserted within a card slot in the same manner as a card. Heat removing airflow is provided to the power supply by the cooling fans which also are utilized to remove heat from the array of cards. Because the power supplies are connected into the backplane by a conventional pin array the necessity for bolted cable connections utilizing rather robust studs is eliminated and the capability for carrying out hot swapping is achieved.

As the systems at hand have become more complex, however, a concomitant requirement for additional card slot space has arisen. Thus, a need is present for a modular form of power supply which is forwardly accessible and exhibits a small size or form factor permitting it to be mounted adjacent the card cage without interfering with that function. This calls for not only diminutive volumetric sizes of the power supply but correspondingly small and preferably multitask handling structures.

Over the recent past, multiple output power supplies with mutually independent outputs have been introduced which achieve a somewhat reduced package size through the utilization of pre-manufactured switching converters, permitting improved power packaging densities. Manufacturers offer them as "bricks", the converters generally being rectangularly shaped packages of typically flat configuration (i.e., one-half inch thickness), one side of which incorporates a heat transfer surface generally formed of aluminum. With the introduction of the switching converters, improved packaging and cooling techniques have been developed. See in this regard: Tracewell, et al, application for U.S. Pat. No. 5,945,746, entitled "Power Supply and Power Supply/Backplane Assembly and System", issued Aug. 31, 1999; Tracewell, et al, U.S. Pat. No. 6,046,921 entitled "Modular Power Supply", issued Apr. 4, 2000; and U.S. Pat. No. 5,940,288 (supra).

Figure 3:
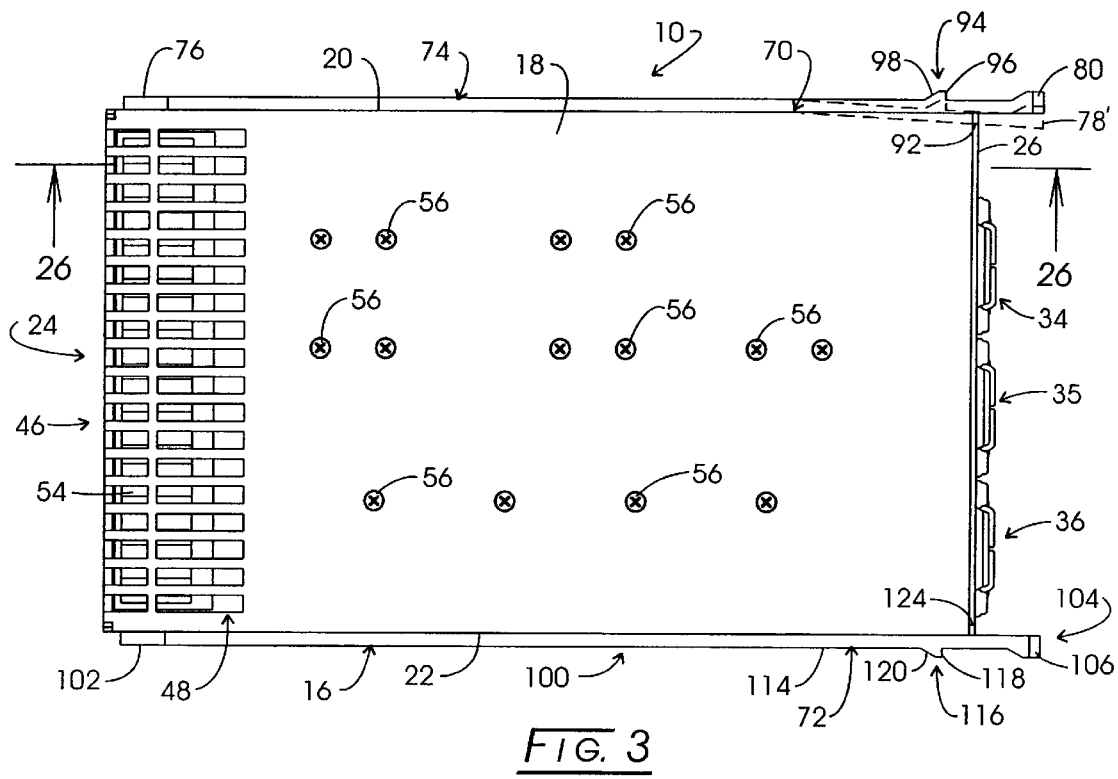
Figure 4:
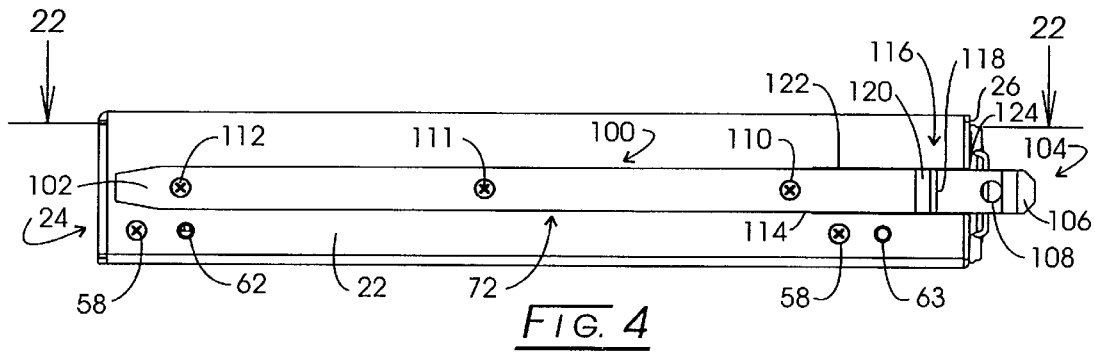
Figure 2:
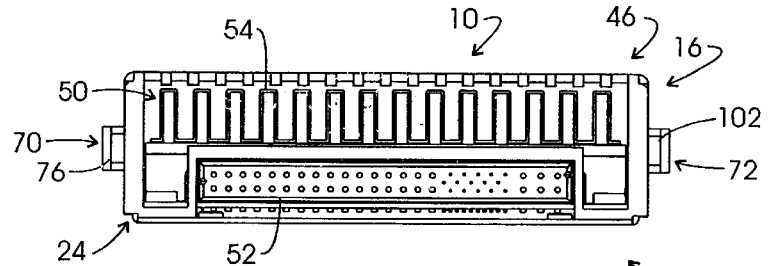
Figure 23:
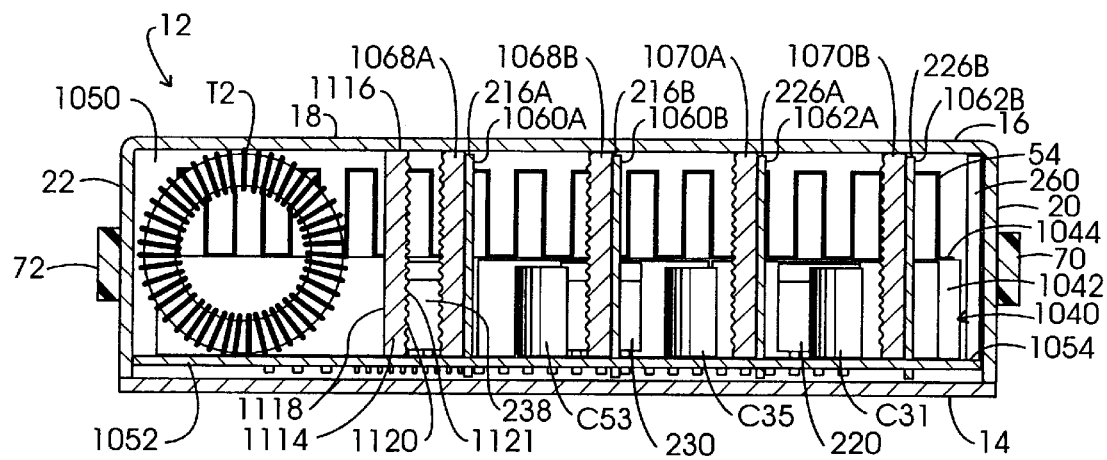
Figure 5:
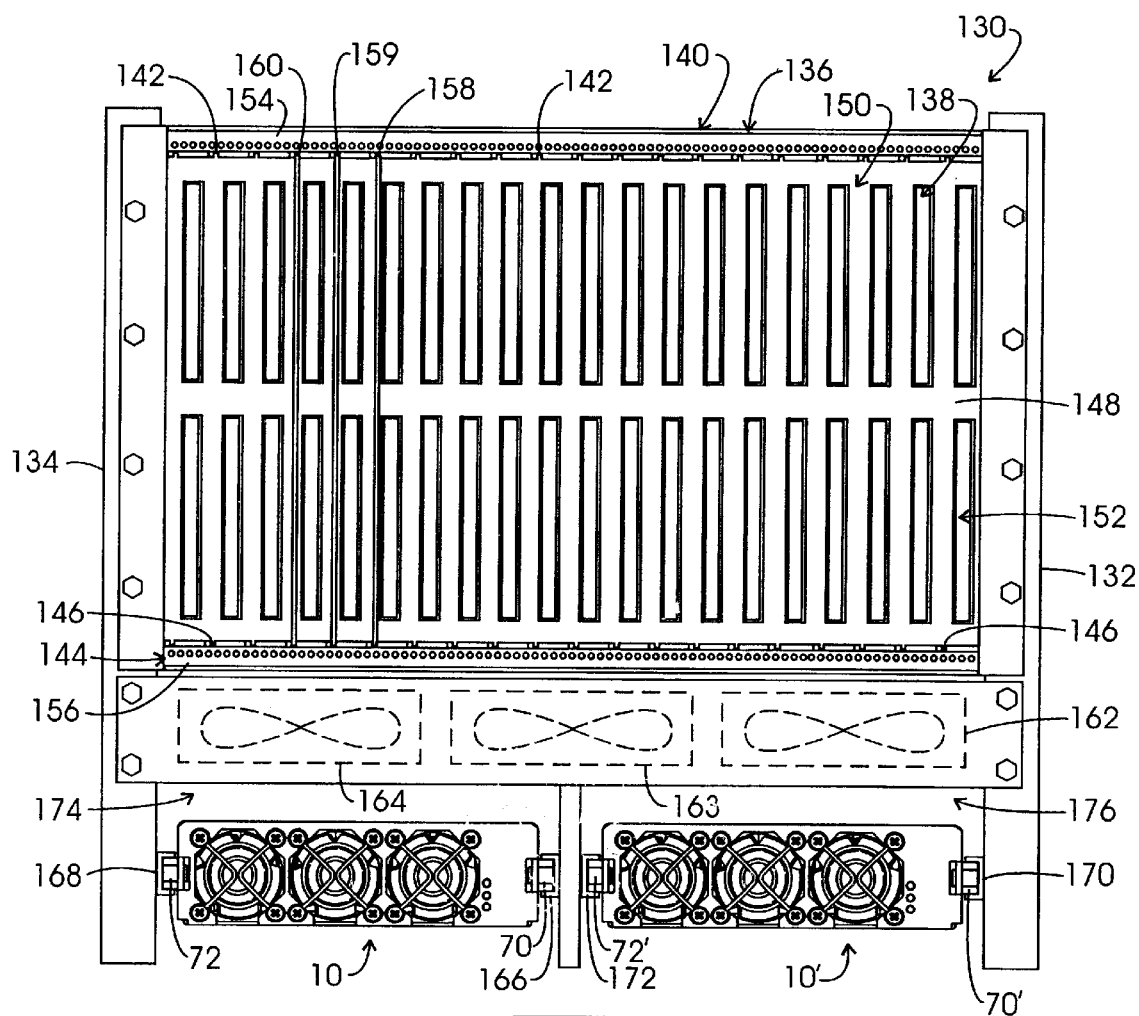

FIG. 1 is a perspective view of a power supply according to the invention;

Because it is necessary to insert and remove the power supply 10 from the forward portion or face of a chassis or sub-rack, a form of mounting and grasping technique is called for by the systems designer. A supporting arrangement for the housing 10 within a chassis is developed utilizing two elongate, polymeric slide members represented generally at 70 and 72. Slide members 70 and 72 are formed of a resilient polymeric material such as a linear polyoxymethylene type acetyl resin having a high strength and solvent resistance which is moldable and sold under the trade designation, "Delrin"; or nylon, a generic designation for any long-chain synthetic polymeric amide which also is characterized by high strength, elasticity and resistance to water and chemicals. Slide member 70 exhibits a generally rectangular cross sectional configuration and is formed having a housing support portion represented generally at 74 which extends to a tapered rearward tip 76. The member 70 extends integrally forwardly from front panel 26 to provide a hand graspable handle portion shown generally at 78. Handle portion 78 terminates in an integrally formed outwardly extending knob 80. Extending through the handle portion 78 at a location forwardly of panel 26 and rearwardly of knob 80 is a transversely disposed purchase hole 82. Hole 82 provides a purchase for a purchase rod to be used to gain leverage in removing housing 10 from a chassis receiving cavity. Such a purchase rod may, for example, be implemented as a common screwdriver. Slide member 70 is attached to sidewall 20 by machine screws 84–86. Screw 84 is positioned just rearwardly of an inflection location represented at 88. From this location 88, the side 20 is formed having an adjacently disposed side receiver slot 90 which extends forwardly to panel 26. Within panel 26, there is formed a rectangular panel receiver slot 92. Located between the forward panel 26 and the inflection location 88 is an integrally formed latching tab represented generally at 94 which is configured having a transversely outwardly disposed abuttable forwardly facing engagement surface 96 and an inwardly sloping camming ramp 98 extending rearwardly therefrom. The side receiver slot 90 and the panel receiver slot 92 are provided having a depth effective to receive the slide member 70 in flexure such that the latching tab 94 may be moved inwardly for carrying out latching engagement and disengagement with the receiving cavity of a chassis. FIG. 3 portrays a portion of that flexure movement in phantom at 78'.

General control over the converter and other functions within the secondary circuit domain, as well as the provision of an interface with the system of the user is developed from a main control circuit which will be seen to be mounted upon a main control board. That function is represented at block 260. The main control 260 performs in conjunction with power supplied from the distribution bus as represented by arrows 222 and 262. The monitoring and control of converter function 216 is represented at arrows 264 and 266. Monitoring and control of the converter function 226 is represented by the latter arrows and arrow 268, while monitoring and control at converter function 234 is represented by arrows 264, 266 and 270. Such monitoring and control is provided with respect to converter function 242 as represented at arrows 264 and 272.

With the arrangement shown, the power supply 10 has functioned to generate the 12 volt distribution bus 400 employing a very simple low cost but highly efficient zero voltage switching inverter. Inverter network 202 is not current limited nor is it's output regulated. However, the voltage level at distribution bus 400 remains essentially constant except in rarely occurring intervals of line drops and the like. That constant voltage value then permits a monitoring of instantaneous total system power utilization by sensing a signal corresponding with bus 400 current. Such a bus current signal will correspond with system power inasmuch as there is a linear relationship between voltage and current to develop power.

Figure 8:
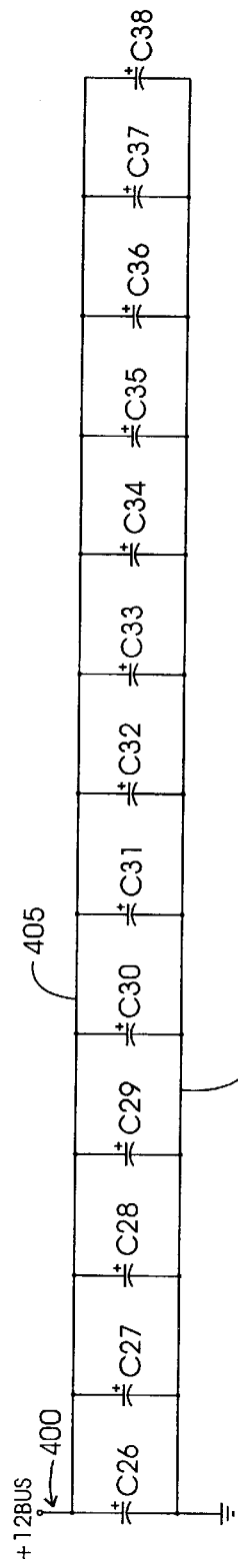

The a.c. signal at lines 392 and 394 is deemed to be a pulsating one, inasmuch as the a.c. current voltage is only positive-going. A d.c. current corresponding with the current at bus 400 as represented by the value of current passing within inductor L3. The current value can be extracted by carrying out an integration. Accordingly, a current detector network which includes an integrator network 402 is provided which is comprised of capacitor C25 along with resistors R8 and R9. Network 402 integrates the voltage developed by the resistance of the windings of inductor L3. A resultant current responsive signal (+12BUS_CURR) is then provided at line 404. The distribution bus 400 further is identified in the drawings as "+12BUS". Additional filtering of the distribution bus is provided by a sequence of 13 capacitors. These capacitors are revealed in FIG. 8 at C26–C38 coupled intermediate lines 405 and 406, the latter line being coupled to the distribution bus.

Figure 6:
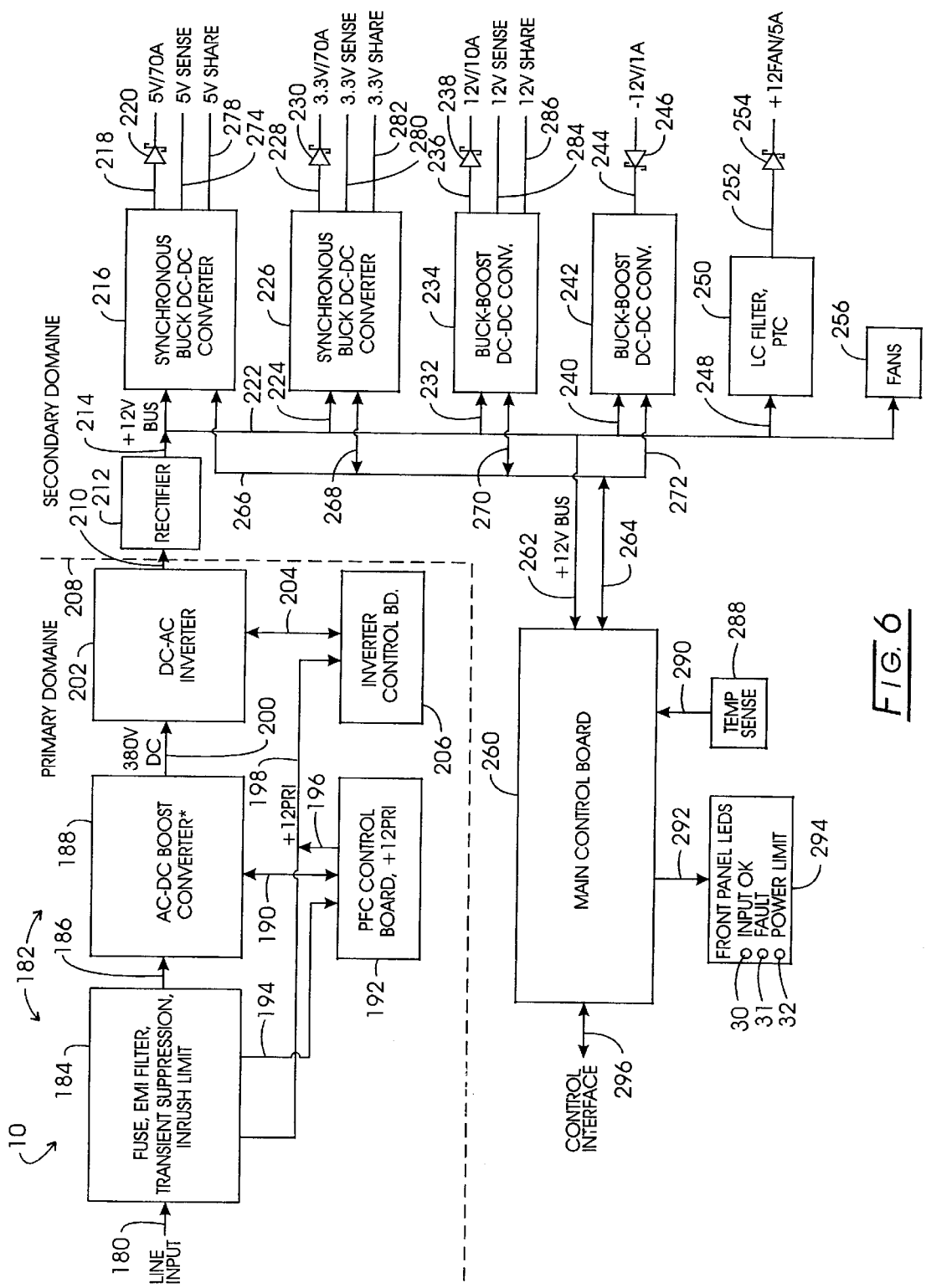
Figure 7A:
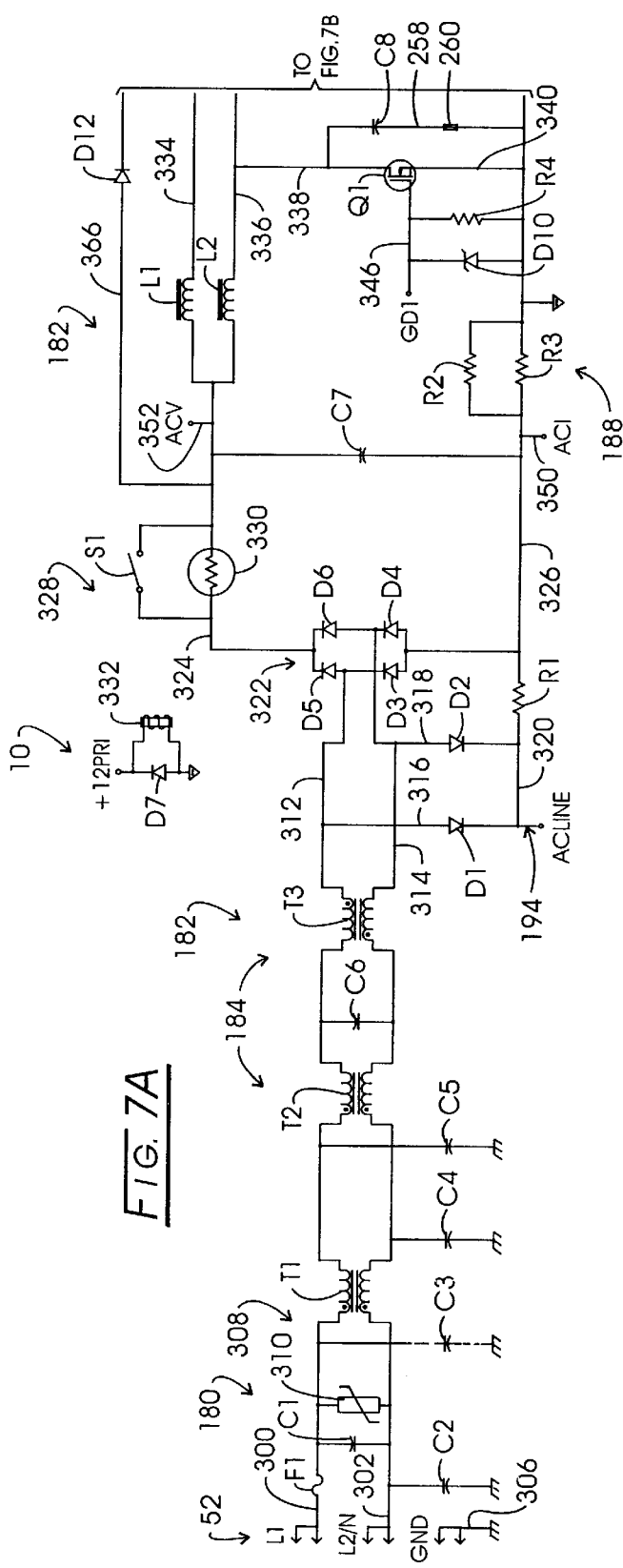
Figure 12:
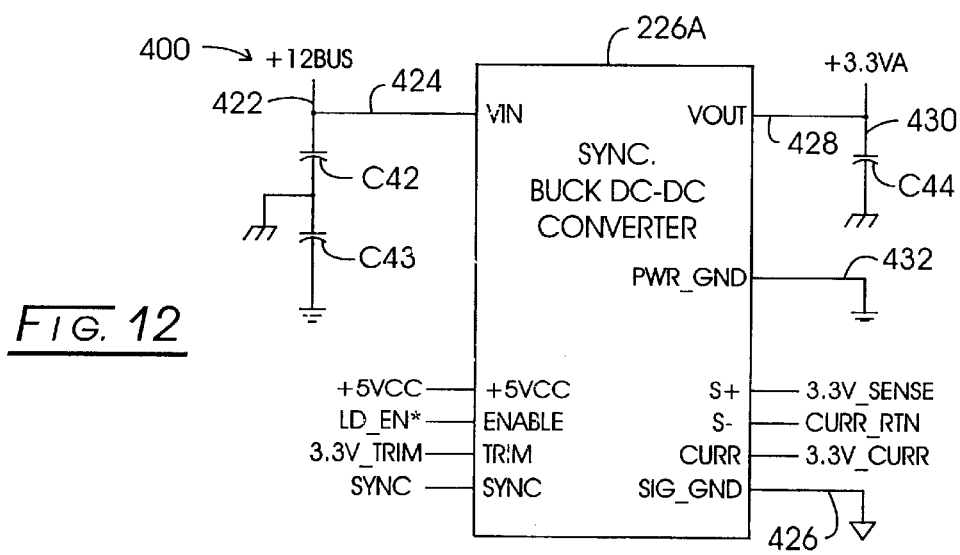

In similar fashion, two identical daughter boards providing the synchronous buck d.c.-to-d.c. converter function represented at block 226 are provided. As before, each such daughter board is configured to provide at a regulated 3.3 volt output with a 35 ampere rating, such outputs being joined together for introduction to the blocking diode function represented in FIG. 6 at symbol 230. Surface mount circuit topology is provided for each of these daughter boards, one of which is identified in FIG. 12 at 226A. The input (VIN) to the instant circuit is provided from the distribution bus (+12BUS) as represented at lines 422 and 424. Line 422 is seen to incorporate filtering capacitors C42 and C43. As noted above, because the converter performs with the distribution bus 400 input, it's operation is fully independent of the circuits of converter function 216. The circuit mounted upon daughter board 226A performs in conjunction with a control board generated control voltage (+5VCC) and signal ground (SIG_GRN) at line 426. The circuit responds to a synchronization input (SYNC) and to a trim input (3.3V_TRIM) and commences operation upon being enabled by a logic low true enable signal (L_DEN). The controller also responds to signals representing a monitoring of the regulated output voltage and current associated therewith as represented at inputs: 3.3V_SENSE, S_RTN, and 3.3V_CURR. A regulated output (+3.3 VA) is seen presented at lines 428 and 430, the latter line incorporating filter capacitor C44. Power ground (PWR_GND) is coupled to ground as represented at line 432.

Figure 7B:
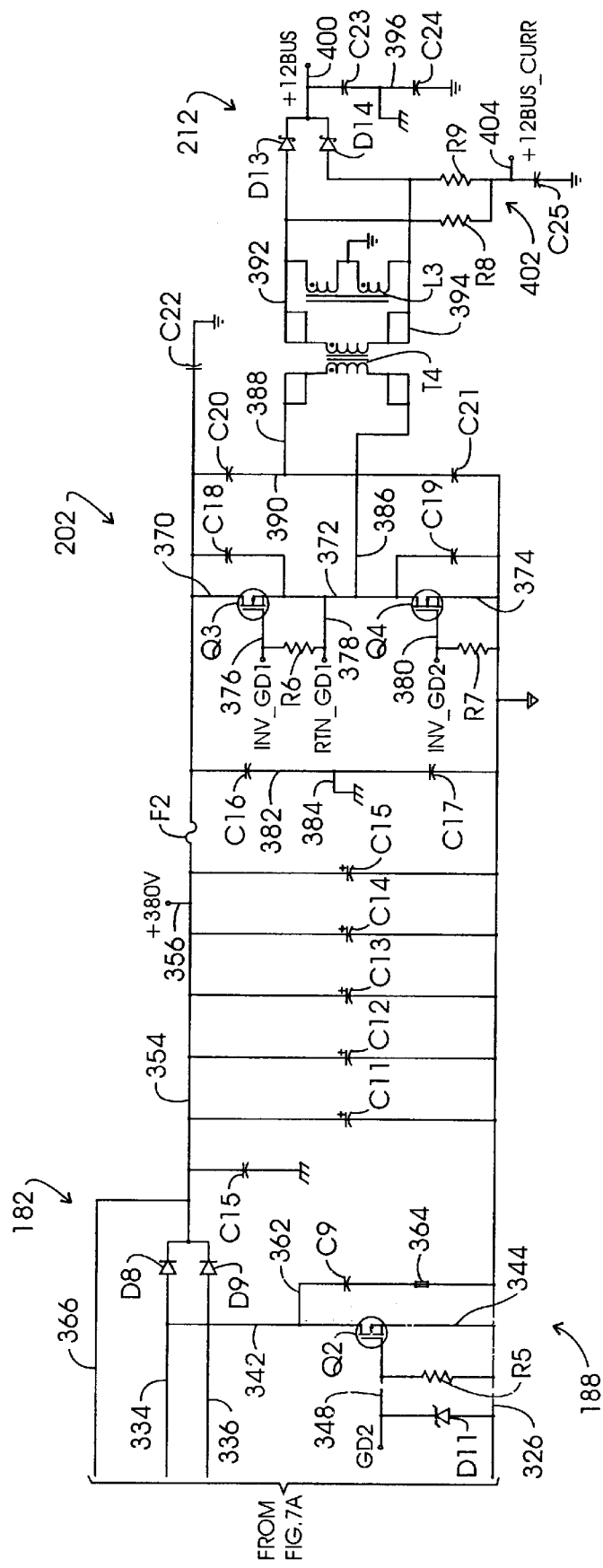

The distribution bus 400 current monitoring signals as discussed in connection with FIG. 7B (+12BUS_CURR, S_RTN) are introduced to limit network 890 at respective lines 900 and 902. Limit network 890 functions with integrator network 402 to provide a current detector network. Lines 900 and 902 incorporate respective input resistors R92 and R93. Line 902 is coupled to ground through resistor R94 and is filtered at capacitor C120 coupled between the line and ground. Line 900 extends to the negative terminal input of an operational amplifier 904, while line 902 extends to its positive terminal. Amplifier 904 provides an output at line 906 and the device is configured as a buffer with feedback capacitor C121 within feedback line 908 and with resistor R95 within line 910.

Figure 20A:
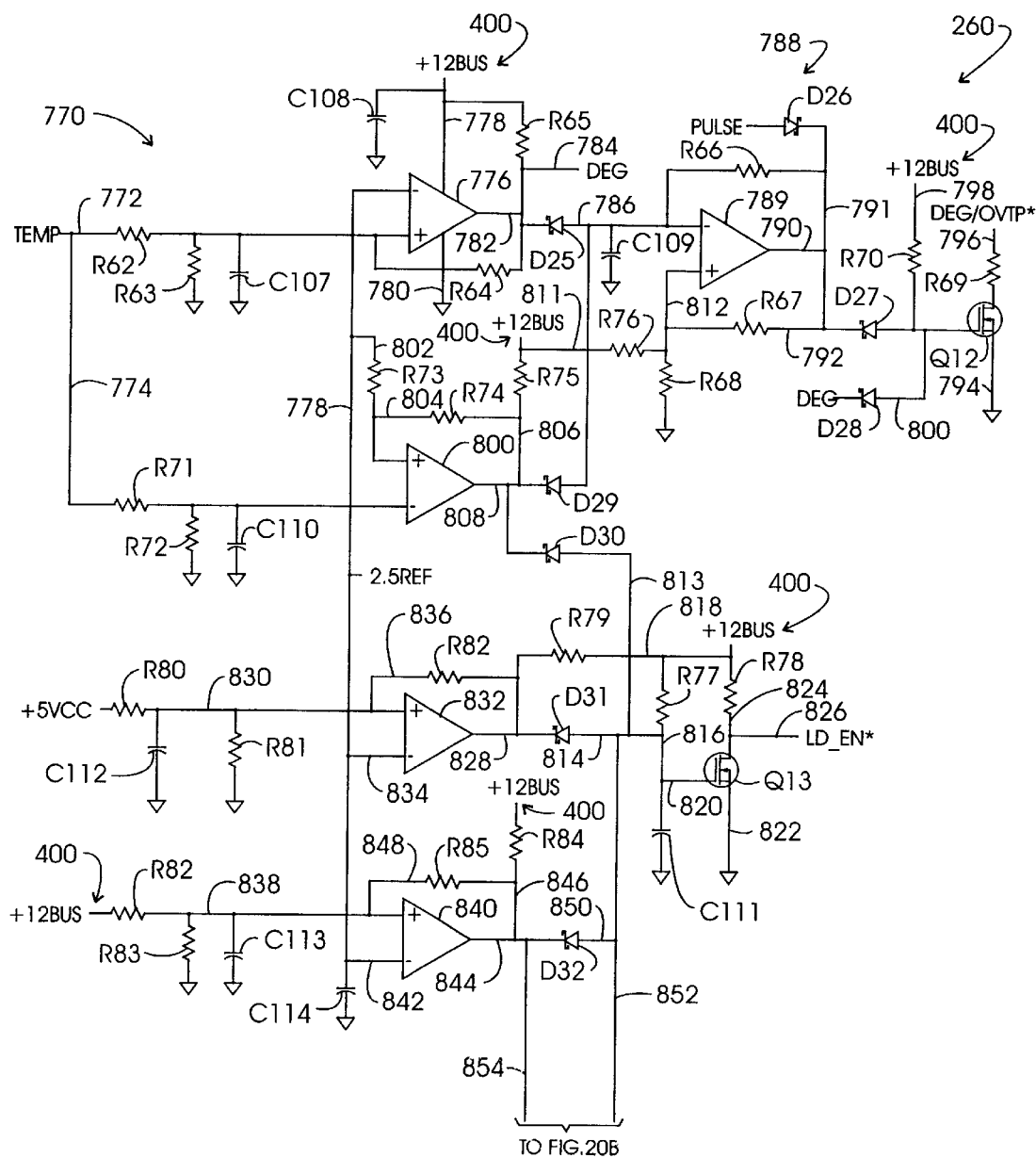
Figure 20B:
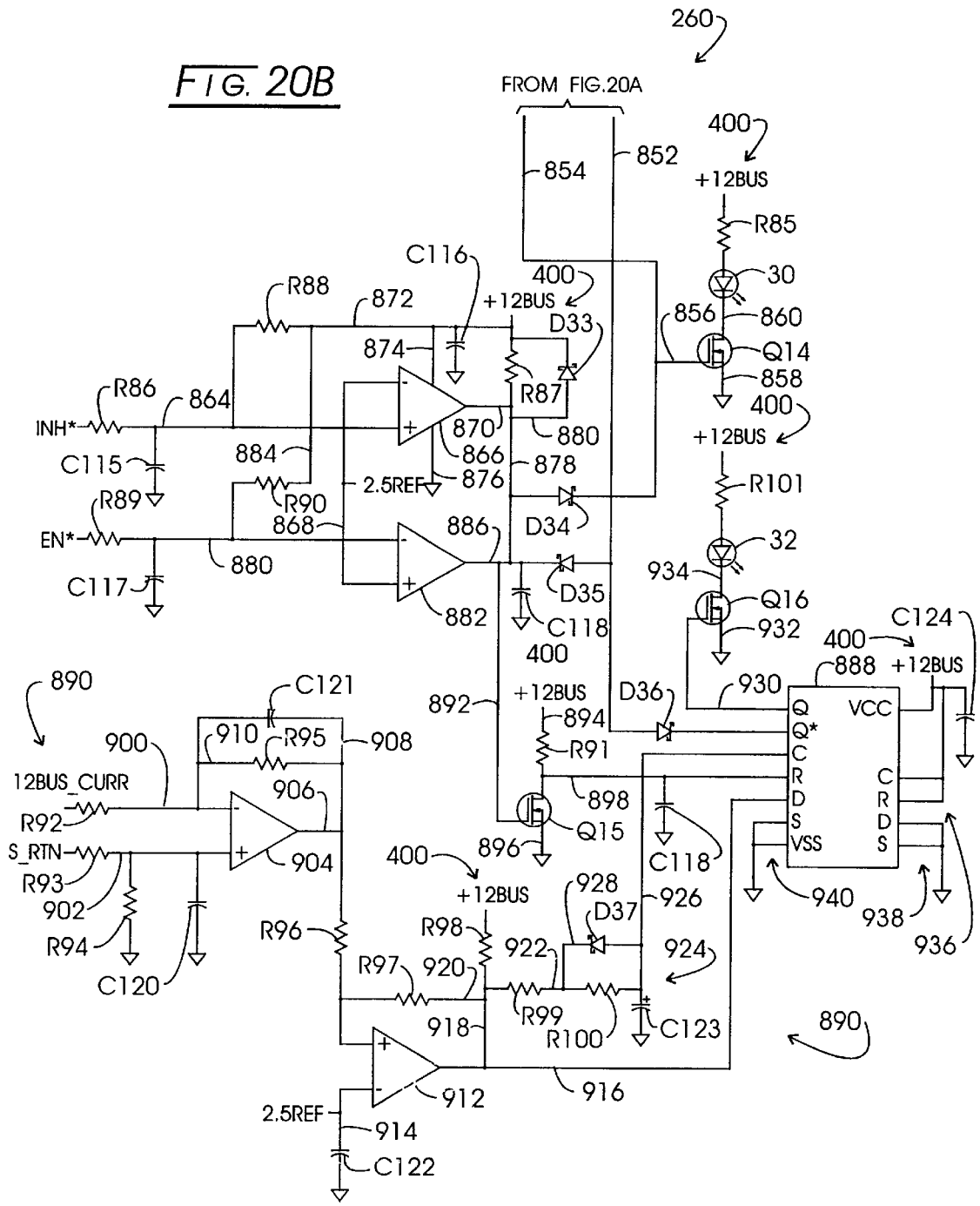
Figure 21:
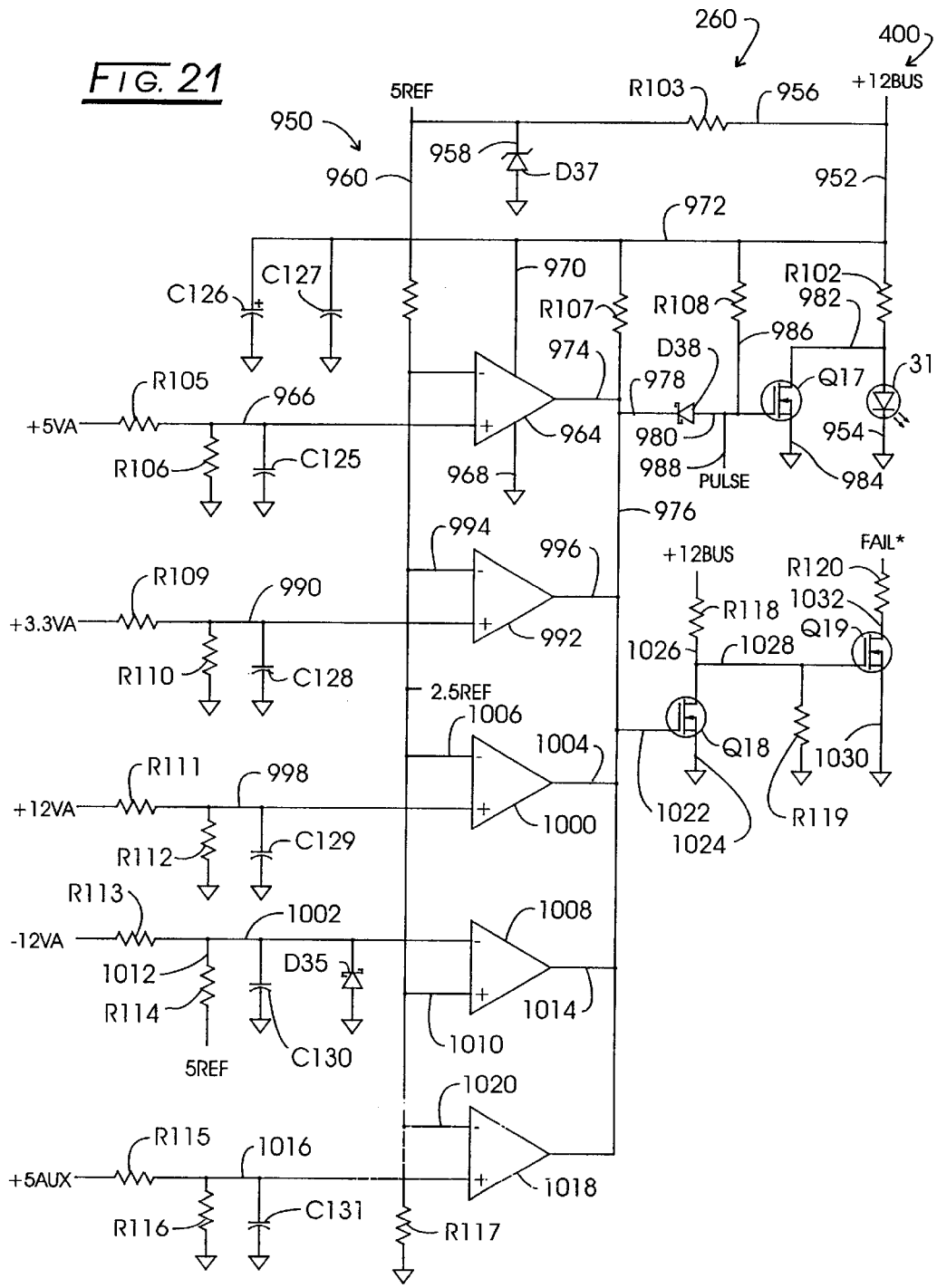
Figure 22:
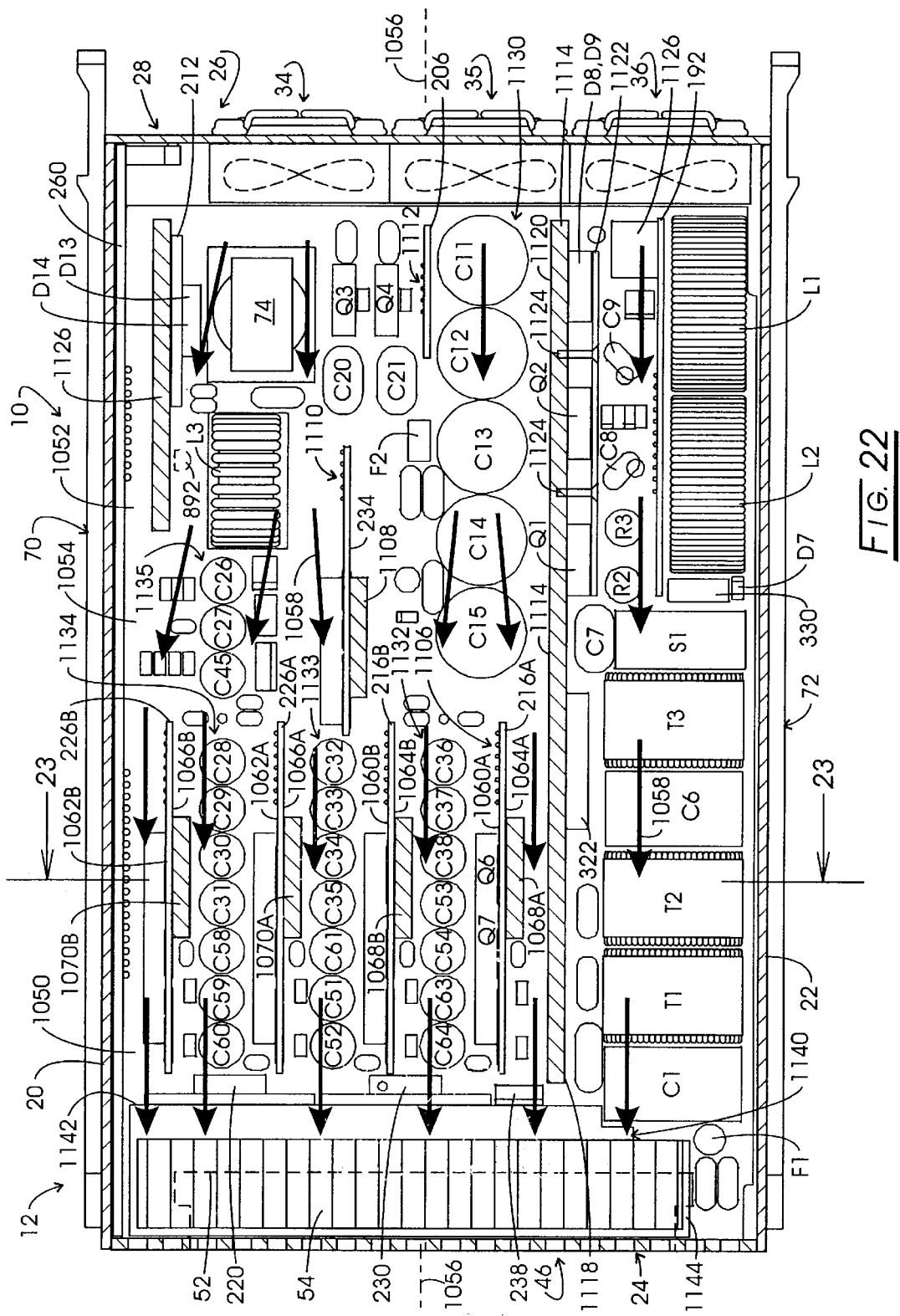

The buffered output at line 908 extends through resistor R96 to the positive input terminal of a comparator 912. The negative terminal of device 912 is coupled via line 914 to reference voltage (2.5REF) representing a comparison signal the line incorporating a filtering capacitor C122 and extending to ground. The output of comparator 912 at line 916 will exhibit a logic high level in the presence of a sensed bus 400 current which is above a predetermined threshold. That logic high is directed to the data, D terminal of latch 888. Comparator 912 is configured in conjunction with line 918 extending from line 916 through resistor R98 to the distribution bus 400 (+12BUS). It is configured in conjunction with resistor R97 within a line 920 extending between lines 918 and 908. Line 918 additionally is coupled by line 922 and resistor R99 to an R-C network represented generally at 924 comprised of resistor R100 and capacitor C123 positioned within line 926. The discharge line 928 incorporating steering diode D37 is coupled between lines 926 and 922. R-C network 924 is one exhibiting a relatively large time constant, for example, 10 seconds. When output line 916 is at a normally low logic level, capacitor C123 remains discharged. However when line 916 transitions to a logic high level representing a power limit condition or signal, then capacitor C123 commences to be charged through resistor 100. Line 926 is coupled with the clock (C) terminal of latch 888. At the termination of the time-out of network 924, the fault condition at line 916 is responded to by terminal Q* assuming a logic low condition which is then present at line 852 which, in turn, functions to turn off transistor 213 (FIG. 20A) and remove the load enable signals to the secondary circuit domain. When terminal Q* transitions to a logic low level, terminal Q transitions to a logic high level. The latter terminal is coupled by line 930 to the gate of transistor Q16. The source of transistor Q16 is coupled by line 932 to ground, while its drain is coupled with line 934 to the distribution bus 400 (+12BUS) and incorporates the power limit diode D32 and resistor R101. Thus, as latch 888 functions to turn off transistor Q13 to, in turn, turn off the converters within the secondary circuit domain, LED32 is energized. When the logic high level occurring at line 916 is removed, then capacitor C123 is rapidly discharged through diode D37. The VCC, C, and R terminals of device 888 are coupled with the distribution bus 400 (+12BUS) at line array 936 which is filtered by capacitor C124. Network 924 serves to delay any shut-down of the power supply 10. This avoids unwanted stoppages which would otherwise occur in the event of spurious line anomalies of relatively short duration. The D and S terminals of device 888 are connected by line array 938 to ground and the S and VSS terminals are coupled to ground by line array 940.

Figure 11:
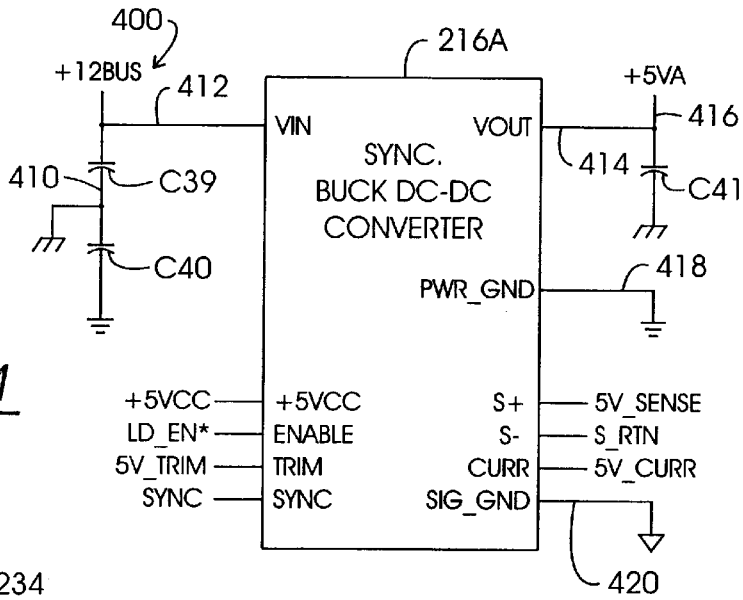
Figure 13:
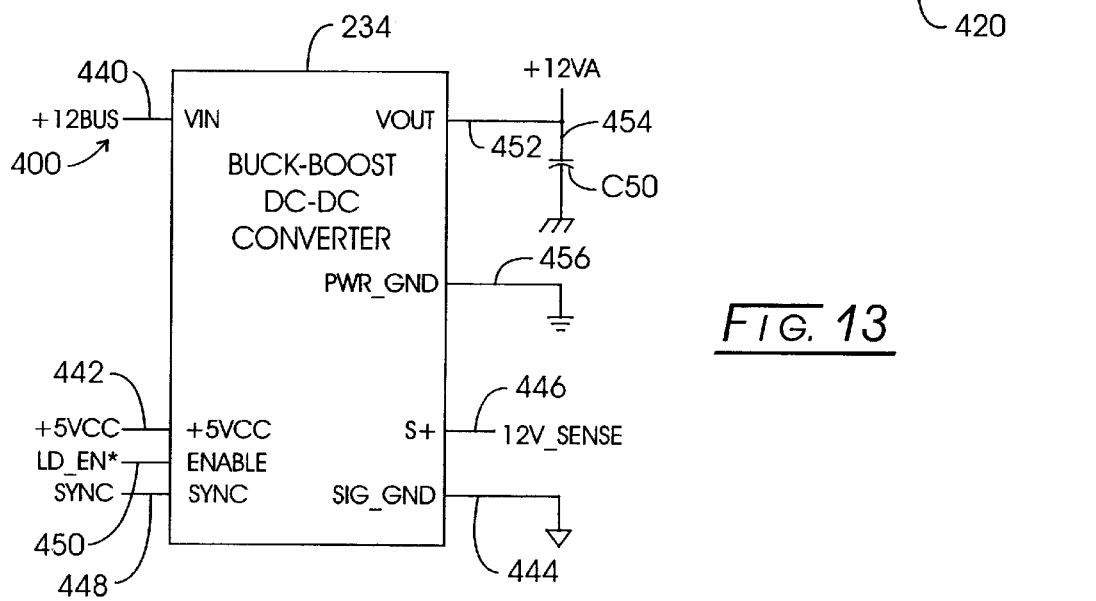
Figure 16A:
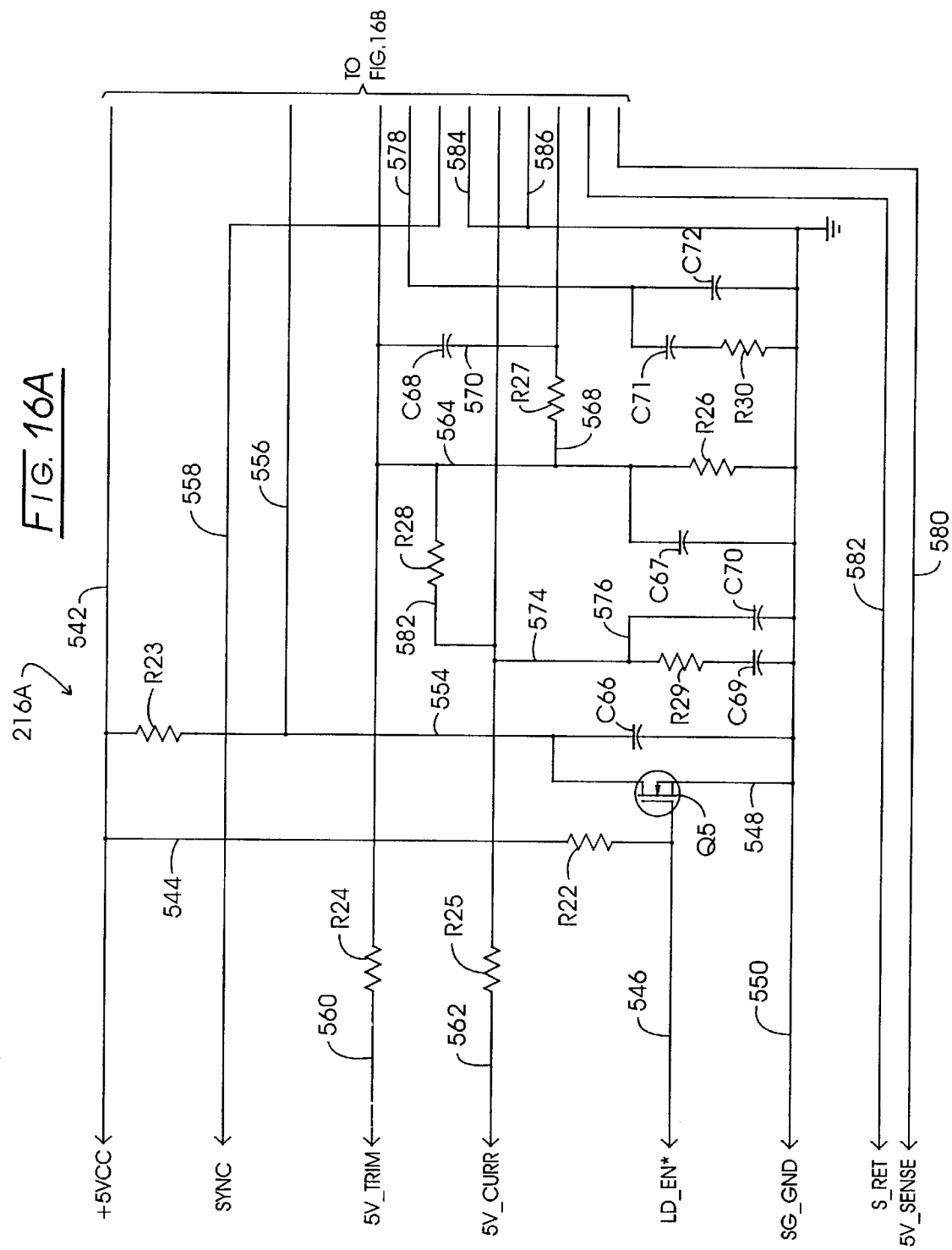
Figure 16B:
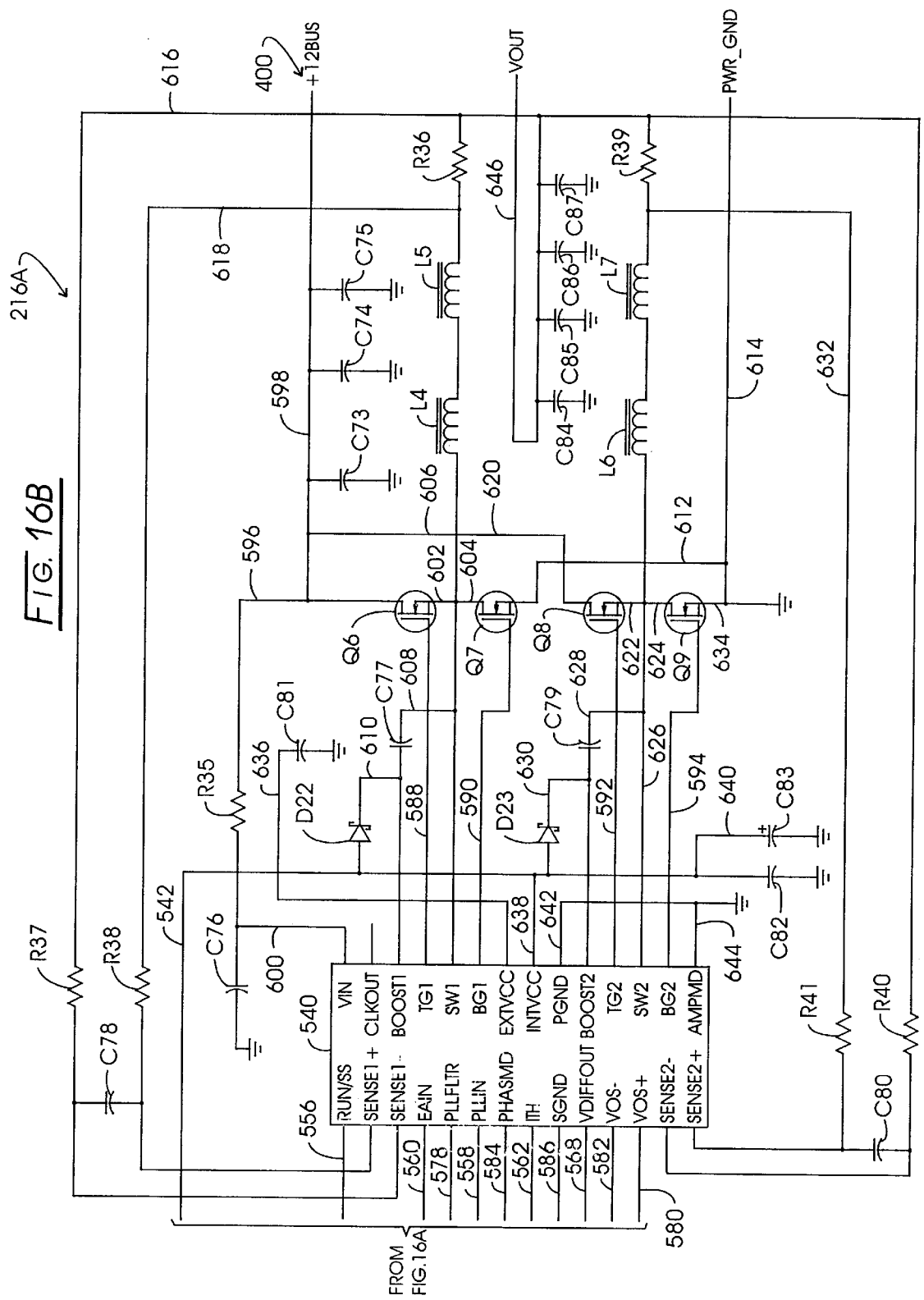

As noted above, the circuitry associated with the daughter boards 216A, 216B and 226A, 226B is essentially identical. So also is the layout of components and structuring of these boards. Looking to FIG. 24, a view of the front face of daughter circuit board 216A is revealed. This same circuit board has been described above in connection with FIGS. 11, 16A and 16B. Accordingly, the principal component identification employed in those figures is repeated in FIG. 24. Note in the figure that the power switching transistors Q6 and Q7 are mounted in spaced-apart but paired adjacency and exhibit a generally rectangular periphery. Similarly, power switching transistors Q8 and Q9 are mounted on the circuit board in such spaced apart paired adjacency. Looking additionally to FIG. 25, it may be observed that a rectangular, thermally conductive conductor plate 1072 is abuttably positioned against the outwardly disposed surfaces 1074 and 1076 of respective transistors Q6 and Q7. Plate 1072 acts, inter alia, as a heat sink and is attached to flat plate heat sink 1068A with a thermally conductive machine screw 1078. Note that screw 1078 extends through a hole 1080 within the daughter board 216A to a threaded engagement within the threaded bore 1082 formed within the heat sink 1068A. Extending through the thin daughter board beneath or at the mounting positions of the transistors Q6 and Q7 are a plurality of metal covered channels or holes certain of which are revealed at 1084 behind transistor Q6 and certain of which are revealed at 1086 behind transistor Q7. Preferably, the holes are filled with a thermally conductive metal, for example, a common solder. The holes function as a thermal or heat transfer conduit between the back sides of transistors Q6 and Q7 positioned against front face 1060A and the heat sink 1068A.

What is claimed is:

1. In the system of electrical circuitry wherein a chassis is employed to support circuit boards in operative association with a backplane, such chassis having a user accessible front portion with oppositely disposed first and second channel-form rails spaced apart a predetermined distance extending within a receiver cavity to a chassis contained multiple pin power supply connector for removable engagement with the corresponding connectors of a power supply, a power supply, comprising:

a housing having a forward panel, oppositely disposed first and second sides spaced apart a housing width corresponding with said predetermined distance and extending rearwardly a housing length to a rear side;

a multiple pin power supply connector supported at said housing rear side and configured for operative engagement with said chassis contained multiple pin power supply connector when said housing is inserted within said chassis receiver cavity;

a first elongate polymeric slide member connected to said housing first side, having a first housing support portion extending to a first rearward tip and slidably engageable with and movable along said first channel-form rail when said housing is moved within said receiver cavity, and extending integrally forwardly from said housing to define a first hand graspable handle portion; and a second elongate polymeric slide member connected to said housing second side, having a second housing support portion extending to a rearward tip and slideably engageable with and movable along said second channel-form rail when said housing is moved within said receiver cavity, and extending integrally forwardly from said housing to define a second hand graspable handle portion.

2. The power supply of claim 1 in which:

said first and second hand graspable handle portions are configured having integrally formed transversely depending respective first and second knobs.

3. The power supply of claim 1 in which:

said first and second hand graspable handle portions are configured having transversely disposed respective first and second purchase holes extending therethrough, having a width effective to receive a purchase rod for facilitating the removal of said housing from said receiver cavity using leverage.

4. The power supply of claim 1 in which:

said first polymeric slide member is resilient and said first housing support portion is connected to said housing first side from a first inflection location to said first rearward tip, and includes an integrally formed first latching tab located between said forward panel and said first inflection location and configured having a transversely outwardly extending, forwardly facing abuttable engagement surface and an inwardly sloping camming ramp extending rearwardly therefrom;

said second polymeric slide member is resilient and said second housing support portion is connected to said housing second side from a second inflection location to said second rearward tip, and includes an integrally formed second latching tab located between said forward panel and said second inflection location and configured having a transversely outwardly extending, forwardly facing abuttable engagement surface and an inwardly sloping camming ramp extending rearwardly therefrom;

said forward panel is configured with an inwardly extending first panel receiver slot adjacent to and aligned with said first slide member;

said housing first side is configured with an inwardly extending first side receiver slot adjacent said first slide member, aligned with said first panel receiver slot and extending rearwardly therefrom to a position adjacent said first inflection location;

each said first panel receiver slot and said first side receiver slot having a depth effective to receive said first slide member in flexure so as to carry out latching and unlatching of said housing within said receiver cavity;

said forward panel is configured with an inwardly extending second panel receiver slot adjacent to and aligned with said second slide member;

said housing second side is configured with an inwardly extending second side receiver slot adjacent said second slide member, aligned with said second panel receiver slot and extending rearwardly therefrom to a position adjacent said second inflection location; and each said second panel receiver slot and said second side receiver slot having a depth effective to receive said second slide member in flexure so as to carry out latching and unlatching of said housing within said cavity.

5. Power supply apparatus for providing regulated d.c. outputs to an electrical system, comprising:

a housing having first and second oppositely disposed parallel sides and third and fourth oppositely disposed parallel sides combining with said first and second sides to define a housing rectangular periphery, having a top and a bottom, air transfer openings at said first and second sides, said third and fourth sides being in parallel relationship with a longitudinal axis;

a fan assembly within said housing providing a driven air path in parallel relationship with said longitudinal axis;

a circuit board extending perpendicularly upwardly from said housing bottom, having front and back oppositely disposed faces aligned with said driven air path and spaced apart a circuit board thickness;

a switching converter circuit formed with surface mount components including two power switching transistors attached to said front face;

said circuit board being configured having a plurality of metal covered channels extending from said front face to said back face underneath the mounting positions of said two power switching transistors and being in thermal exchange communication therewith; and including a flat metal heat sink having an outer surface and an inner surface, said inner surface being attached to said back face in thermal exchange communication with said metal covered channels.

6. The power supply apparatus of claim 5 in which said metal heat sink outer surface is configured with an array of surface area enlarging serrations.

7. The power supply apparatus of claim 6 including a thermally conductive connector plate abuttably positioned against an outwardly disposed surface of a said power switching transistor; and a thermally conductive connector connecting said connector plate with said flat metal heat sink through said circuit board.

8. The power supply apparatus of claim 5 in which said circuit board thickness is about 0.047 inch.

9. Power supply apparatus connectable with a power input for providing regulated d.c. outputs to an electrical system, comprising:

a housing having first and second oppositely disposed parallel sides and third and fourth oppositely disposed parallel sides combining with said first and second sides to define a housing rectangular periphery and including a thermally conductive top and a bottom to define an internal cavity;

a fan assembly within said housing providing a driven air path in generally parallel relationship with said first side;

a circuit board parallel with and adjacent said housing bottom and extending to adjacency with said first side;

a regulator circuit within said housing cavity responsive to a treated power input to provide a regulated output;

an input treatment network responsive to said power input to derive said treated power input and including heat generating input circuit components electrically coupled to said circuit board;

an elongate, flat, thermally conductive heat transfer plate having a top side connected in heat transfer relationship with said housing top, extending therefrom to perpendicular adjacency with said circuit board, having a first surface spaced from, facing and parallel with said first housing side to define a corridor with an air pathway and having an opposite second surface within said driven air path; and said heat generating input treatment circuit components being connected in thermal transfer relationship with said heat transfer plate.

10. The power supply apparatus of claim 9 in which said heat generating input treatment circuit components are connected with said heat transfer plate first surface within said corridor.

11. The power supply apparatus of claim 10 in which said heat transfer plate second surface is configured with an array of surface area enlarging serrations.

12. The power supply apparatus of claim 11 in which said serrations are disposed longitudinally along said second surface in parallel relationship with said driven air path.

13. Power supply apparatus for providing regulated d.c. outputs to an electrical system supported by a rack having a multiple pin power supply connector, comprising:

a housing supported within said rack having a forward end with a forward air transfer opening, said housing extending rearwardly to a rearward end with a rearward air transfer opening, having a top and a bottom and oppositely disposed sides to define an internal cavity within which driven air is directed from said forward air transfer opening through said rearward air transfer opening;

a circuit board within said internal cavity parallel with and adjacent said housing bottom and extending to adjacency with said rearward end;

a regulator circuit within said housing internal cavity having a regulated output electrically coupled with said circuit board;

a housing multiple pin connector adjacent said rearward end electrically connected with said circuit board for receiving and conveying said regulated output and connectable with said rack multiple pin power supply connector; said connector having a forwardly facing surface, a bottom surface and a top surface spaced below said housing top;

a thermally conductive heat transfer component with a forward portion extending normally upwardly from said circuit board adjacent said connector forwardly facing surface and a top portion extending in adjacency over said connector top surface;

including a heat generating blocking diode assembly coupled with said circuit board in electrical communication between said regulated output and said housing multiple pin connector and coupled in thermal exchange relationship with said heat transfer component forward portion; and a thin sheet metal folded fin heat exchanger array mounted in heat exchange relationship with said heat transfer component top portion, having parallel channels aligned for receiving said driven air and directing it through said rearward air transfer opening.

14. The power supply apparatus of claim 13 in which, said housing top is thermally conductive and includes an upper rearward air transfer opening extending forwardly from said rearward end; and said folded fin heat exchanger array is spaced in non-contacting relationship from said housing top and located in adjacency with said upper rearward air transfer opening.

* * * * *